(12) United States Patent
Akaba et al.

(10) Patent No.: US 7,686,118 B2
(45) Date of Patent: Mar. 30, 2010

(54) SEATBELT APPARATUS

(75) Inventors: Hiroshi Akaba, Kawachi-gun (JP);
Koichi Kamiji, Haga-gun (JP);
Yoshihisa Sugamata, Shioya-gun (JP)

(73) Assignee: Honda Motor Co., Ltd., Tokyo (JP)

( * ) Notice: Subject to any disclaimer, the term of this patent is extended or adjusted under 35 U.S.C. 154(b) by 1283 days.

(21) Appl. No.: 11/188,515

(22) PCT Filed: Jan. 22, 2004

(86) PCT No.: PCT/JP2004/000560

§ 371 (c)(1),
(2), (4) Date: Jul. 20, 2005

(87) PCT Pub. No.: WO2004/065182

PCT Pub. Date: Aug. 5, 2004

(65) Prior Publication Data

US 2005/0252710 A1    Nov. 17, 2005

(30) Foreign Application Priority Data

Jan. 24, 2003   (JP)   ............................. 2003-016311

(51) Int. Cl.
*B60R 21/00*   (2006.01)
(52) U.S. Cl. ..................... 180/268; 280/806; 280/807; 701/45
(58) Field of Classification Search ................. 180/268; 280/806, 807; 701/45
See application file for complete search history.

(56) References Cited

U.S. PATENT DOCUMENTS

| 5,552,986 | A | * | 9/1996 | Omura et al. .................. 701/45 |
| 5,631,639 | A |   | 5/1997 | Hibino et al. |
| 5,788,281 | A |   | 8/1998 | Yanagi et al. |
| 6,374,168 | B1 | * | 4/2002 | Fujii ........................... 701/45 |
| 6,626,463 | B1 | * | 9/2003 | Arima et al. ................. 280/806 |
| 6,729,650 | B2 | * | 5/2004 | Midorikawa et al. ......... 280/807 |
| 6,846,019 | B2 | * | 1/2005 | Tobata ......................... 280/806 |
| 6,997,474 | B2 | * | 2/2006 | Midorikawa et al. ......... 280/735 |
| 7,028,802 | B2 | * | 4/2006 | Tobata ......................... 180/268 |
| 7,059,444 | B2 | * | 6/2006 | Kachu ......................... 180/268 |

(Continued)

FOREIGN PATENT DOCUMENTS

JP   6-286581   10/1994

(Continued)

OTHER PUBLICATIONS

Japanese Office Action dated Nov. 14, 2006.

(Continued)

*Primary Examiner*—Toan C To
(74) *Attorney, Agent, or Firm*—Hamre, Schumann, Mueller & Larson, P.C.

(57) ABSTRACT

A seatbelt apparatus (15) includes a seatbelt (14) for restraining an occupant (10) in a seat (13) of a vehicle, an actuator (29) for tightening the seatbelt (14) at various levels of tension and for loosening the seatbelt (14), plural collision prediction devices (38, 39) for predicting occurrence of a collision, and a control device (35) for controlling the actuator (29) so as to exert one of the various levels of tension on the seatbelt (14) depending on the prediction results by the collision prediction devices (38, 39).

2 Claims, 5 Drawing Sheets

U.S. PATENT DOCUMENTS

| | | | |
|---|---|---|---|
| 7,343,999 B2 * | 3/2008 | Cuddihy et al. | 180/268 |
| 7,475,840 B2 * | 1/2009 | Heckmayr | 242/374 |
| 7,588,114 B2 * | 9/2009 | Cuddihy et al. | 180/268 |
| 7,600,600 B2 * | 10/2009 | Inuzuka et al. | 180/272 |
| 7,613,568 B2 * | 11/2009 | Kawasaki | 701/301 |
| 2003/0015864 A1 | 1/2003 | Midorikawa et al. | |

FOREIGN PATENT DOCUMENTS

| | | |
|---|---|---|
| JP | 7-81520 | 3/1995 |
| JP | 2002-200950 | 7/2002 |
| JP | 2002-211355 | 7/2002 |
| WO | WO 02/055349 | 7/2002 |
| WO | WO 03/051686 | 6/2003 |

OTHER PUBLICATIONS

European Office Action dated Jul. 25, 2006.

* cited by examiner

SEATBELT APPARATUS

FIELD OF THE INVENTION

The present invention relates to a seatbelt apparatus in which a seatbelt may be tightened using an actuator such as an electric motor.

DESCRIPTION OF RELATED ART

A technical means for a seatbelt apparatus in which a seatbelt may be tightened using an electric motor as an actuator is disclosed in Japanese Patent No. 2946995, in which a seatbelt is tightened by exerting a first tension thereon using a pretensioner having an electric motor when a collision of the vehicle is predicted, and the seatbelt is tightened by exerting a second tension, which is greater than the first tension, thereon using an explosive pretensioner when a collision of the vehicle is detected.

In the seatbelt apparatus disclosed in the above-mentioned patent document, because tension is exerted on the seatbelts based on a prediction that there may be a collision with a moving object in front of the vehicle or a moving vehicle in front of the vehicle so that occupants are restrained in the seats by the seatbelts, the seatbelt apparatus must be configured beforehand so as to be able to exert great amounts of tension on the seatbelts in order to ensure tightening of the seatbelts. Due to progresses made in radar technology in recent years, irregularities in the road can also be detected, and as a result, the occupants may experience unnecessary unusual sensations due to great amounts of tension exerted on the seatbelts even when there is low probability of collision.

DISCLOSURE OF THE INVENTION

In view of the above circumstances, an object of the present invention is to provide a seatbelt apparatus in which, when a collision is predicted and occupants are to be restrained in their seats, an optimum amount of tension can be exerted on the seatbelts depending on prediction results for a collision.

In order to achieve the above objects, the present invention provides a seatbelt apparatus including: a seatbelt for restraining an occupant in a seat of a vehicle; an actuator for tightening the seatbelt at various levels of tension and for loosening the seatbelt; plural collision prediction devices for predicting occurrence of a collision; and a control device for controlling the actuator so as to exert one of the various levels of tension on the seatbelt depending on the prediction results by the collision prediction devices.

According to the above seatbelt apparatus, because the control device exerts one of the tensions of differing amounts in the seatbelt depending on the prediction results by the collision prediction devices, it is possible to exert great amounts of tension on the seatbelt so as to strongly tighten the seatbelt when probability of collision is high, and to exert a small amount of tension on the seatbelt so as to moderately tighten the seatbelt when probability of collision is low.

In the above seatbelt apparatus, the collision prediction devices may include at least two of a stationary object collision prediction device for predicting occurrence of a collision with a stationary object, a moving object collision prediction device for predicting occurrence of a collision with a moving object, and a brake operation collision prediction device for predicting occurrence of a collision based on an operation of the brake of the vehicle.

According to the above seatbelt apparatus, because the collision prediction devices include at least two of a stationary object collision prediction device for predicting occurrence of a collision with a stationary object, a moving object collision prediction device for predicting occurrence of a collision with a moving object, and a brake operation collision prediction device for predicting occurrence of a collision based on an operation of the brake of the vehicle, the control device can exert an optimum amount of tension on the seatbelt depending on the prediction results predicted by the collision prediction devices.

In the above seatbelt apparatus, the collision prediction devices may include a stationary object collision prediction device for predicting occurrence of a collision with a stationary object, a moving object collision prediction device for predicting occurrence of a collision with a moving object, and a brake operation collision prediction device for predicting occurrence of a collision based on an operation of the brake of the vehicle, and the control device may be adapted to exert a greater amount of tension on the seatbelt when occurrence of a collision is predicted by the moving object collision prediction device and when occurrence of a collision is predicted by the brake operation collision prediction device than when occurrence of a collision is predicted by the stationary object collision prediction device.

According to the above seatbelt apparatus, because the control device is adapted to exert a greater amount of tension on the seatbelt when occurrence of a collision is predicted by the moving object collision prediction device and when occurrence of a collision is predicted by the brake operation collision prediction device than when occurrence of a collision is predicted by the stationary object collision prediction device, when irregularities in the road, which are frequently detected as stationary objects in a normal travel of a vehicle, are detected, i.e., when probability of collision is low, a small amount of tension is exerted on the seatbelt, and when a moving object at a short distance, which is less frequently detected in a normal travel of a vehicle, is detected, i.e., when probability of collision is high, a great amount of tension is exerted on the seatbelt.

In the above seatbelt apparatus, the control device may be adapted to temporarily increase electric current supplied to the actuator at the beginning of controlling of the actuator for exerting tension on the seatbelt.

According to the above seatbelt apparatus, because the control device is adapted to temporarily increase electric current supplied to the actuator at the beginning of controlling of the actuator for exerting tension on the seatbelt, the operation of the actuator can be accelerated.

PREFERRED EMBODIMENTS OF THE INVENTION

An embodiment of a seatbelt apparatus according to the present invention will be explained below with reference to the appended drawings.

Figure 1:
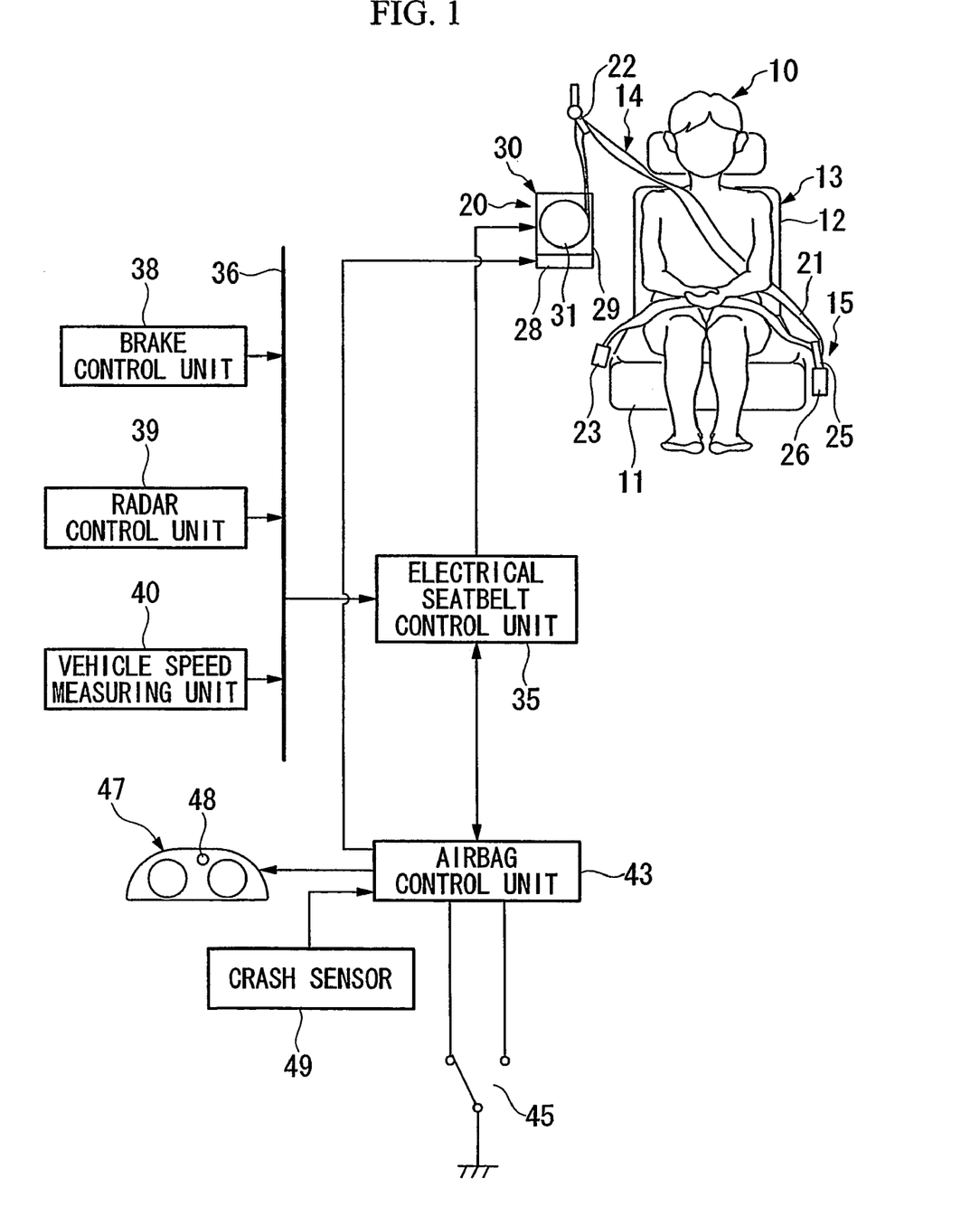
FIG. 1 is a diagram showing the general construction of an embodiment of a seatbelt apparatus and an associated system according to the present invention.

As shown in FIG. 1, a seatbelt apparatus 15 according to the present embodiment, which restrains an occupant 10 using a seatbelt 14, is provided with a seat 13 that includes a seat cushion 11 for mainly supporting the buttocks of the occupant 10, and a seatback 12 for mainly supporting the back of the occupant 10. The seatbelt apparatus 15 in this embodiment provided with the seat 13 includes a so-called three-point seatbelt device.

In the seatbelt apparatus 15, a webbing 21 of the seatbelt 14 extends upward from a retractor 20 which is provided on a center pillar or the like (not shown) that is located at the outside in the compartment with respect to the seat 13, and runs through a through anchor 22 which is supported an upper portion of the center pillar. An end of the webbing 21 is attached to the vehicle floor via an outer anchor 23 which is located at the outside in the compartment with respect to the seat 13. The seatbelt 14 is provided with a tongue plate 25 through which a portion of the webbing 21 positioned between the through anchor 22 and the outer anchor 23 runs. The tongue plate 25 is made engageable with and disengageable from a buckle 26 which is attached to the vehicle floor at the inside in the compartment with respect to the seat 13.

When the seatbelt 14 is drawn out from the retractor 20 by being drawn at the tongue plate 25 by the occupant 10 seated in the seat 13, and the tongue plate 25 is engaged with the buckle 26, a portion of the seatbelt 14 from the through anchor 22 to the tongue plate 25 mainly restrains a portion of the occupant 10 from the shoulder to the chest on the side opposite to the seat 13, and a portion of the seatbelt 14 from the tongue plate 25 to the outer anchor 23 mainly restrains the abdomen of the occupant 10 on the side opposite to the seat 13.

The retractor 20 is provided with a first pretensioner 28 which is a well-known and irreversible explosive pretensioner for instantly retracting the seatbelt 14 using an explosive force of an explosive, or alternatively, an irreversible spring type pretensioner.

The retractor 20 is also provided with a reversible second pretensioner 30 for retracting and tightening the seatbelt 14 using drive power of an electric motor 29. More specifically, in the second pretensioner 30, a reel 31, which is housed in the retractor 20 for winding the webbing 21, on the one hand, enforcedly winds and draws the seatbelt 14 by being rotatably driven by the electric motor 29, and on the other hand, the mechanical engagement of the reel 31 with the electric motor 29 is disengaged so as to make the reel 31 idle and be driven by a spring, and thereby tightening of the seatbelt 14 released so that the seatbelt 14 is relaxed. The construction of the retractor 20 is not shown because it is well-known. Alternatively, the electric motor 29 may be a motor which is capable of performing normal rotation and reverse rotation, and the electric motor 29 may be operated such that the seatbelt 14 is tightened by the normal rotation, and the seatbelt 14 is relaxed by the reverse rotation.

To the electric motor 29, a control unit for controlling the operation of the electric motor 29, i.e., an electrical seatbelt control unit 35 is connected. The electrical seatbelt control unit 35 is connected to a connection bus 36 of an inter-vehicle LAN and controls the electric motor 29 in such a manner that the seatbelt 14 is drawn taut so as to restrain the occupant 10 when occurrence of a collision with an object in front of the vehicle is predicted, and that the mechanical engagement of the reel 31 housed in the retractor 20 with the electric motor 29 is automatically disengaged when the prediction of a collision is cancelled.

To the connection bus 36, a brake control unit 38 for sending out a brake signal indicating a possibility of a collision based on an operation of the brake, a radar control unit 39 for sending out a signal indicating a possibility of a collision with an moving object such as a vehicle and a signal indicating a possibility of a collision with a stationary object such as an obstacle, and a vehicle speed measuring unit 40 for measuring vehicle speed are connected.

Moreover, to the electrical seatbelt control unit 35, an airbag control unit 43 for controlling a supplementary restraint device including an airbag is connected.

The brake control unit 38 sends a signal indicating a possibility of a collision (a BA signal) to the electrical seatbelt control unit 35 when a pressing rate of the brake pedal exceeds a threshold which is determined depending on the current vehicle speed.

The BA signal may be sent out when a dangerous operation to the vehicle, such as a quick steering operation, is detected.

The BA signal may be sent out when a dangerous state of the vehicle is detected, for example, when slip of the wheel is detected based on a difference between the rotational speeds of the right and left wheels.

The radar control unit 39 detects an object in front of the vehicle using a radar. The radar control unit 39 determines that there is a possibility of a collision when the relationship between the object and the vehicle (e.g., distance, relative velocity, etc.) satisfies predetermined conditions, and determines that there is no possibility of a collision when the relationship does not satisfy predetermined conditions. In the present invention, prediction of occurrence of a collision is executed with regard to not only in front of the vehicle, but also behind the vehicle, and the right and left of the vehicle.

The radar control unit 39 detects, for example, an object in front of the vehicle using the radar, and the radar control unit 39 determines whether the object is a stationary object or a moving object based on the relative velocity between the object and the vehicle, or the like, when it is determined that the distance between the object and the vehicle is decreased to less than a predetermined value based on the radar signals.

When it is determined that the object with which a collision is predicted is a stationary object, the radar control unit 39 sends a stationary object signal indicating a possibility of a collision with a stationary object to the electrical seatbelt control unit 35. On the other hand, when it is determined that the object with which a collision is predicted is a moving object, the radar control unit 39 sends a moving object signal indicating a possibility of a collision with a moving object to the electrical seatbelt control unit 35.

The vehicle speed measuring unit 40 sends a vehicle speed signal, which is output from a vehicle speed sensor, to the electrical seatbelt control unit 35.

To the airbag control unit 43 for controlling the airbag, a buckle switch 45, which detects whether the tongue plate 25 provided on the seatbelt 14 of the seatbelt apparatus 15 is engaged with the buckle 26, i.e., whether the seatbelt 14 is worn, is connected. Moreover, to the airbag control unit 43, a warning lamp 48 installed in an instrument board 47 provided in an instrument panel pad is connected. In addition, a crash sensor 49 is connected to the airbag control unit 43.

A buckle signal output from the buckle switch 45 is sent to the electrical seatbelt control unit 35 via the airbag control unit 43. When the seatbelt apparatus 15 has a failure, the electrical seatbelt control unit 35 notifies the occupant 10 of the failure by lighting the warning lamp 48 using the airbag control unit 43.

The electrical seatbelt control unit 35 of the seatbelt apparatus in this embodiment controls the electric motor 29 so as to exert tension and tighten the seatbelt 14 depending on prediction results obtained by the brake control unit 38 and the radar control unit 39 for performing prediction of a collision of the vehicle. The electrical seatbelt control unit 35 applies a tightening operation to the seatbelt 14 at the earliest instance among when a collision with a stationary object in front of the vehicle is predicted by the radar control unit 39 (i.e., when a signal indicating a possibility of a collision with a stationary object is sent out), when a collision with a moving object in front of the vehicle is predicted by the radar control unit 39 (i.e., when a signal indicating a possibility of a collision with a moving object is sent out), and when a collision is predicted by the brake control unit 38 based on the pressing rate of the brake pedal (i.e., when the BA signal is sent out).

Moreover, the electrical seatbelt control unit 35 executes a control operation such that one of the tensions of differing amounts is applied to the seatbelt 14 depending on whether a collision is predicted by the brake control unit 38, a collision with a stationary object is predicted by the radar control unit 39, or a collision with a moving object is predicted by the radar control unit 39. More specifically, the electrical seatbelt control unit 35 controls the electric motor 29 so as to exert a tension of F3 when a collision with a stationary object in front of the vehicle is predicted by the radar control unit 39, to exert a tension of F2, which is greater than F3, when a collision with a moving object in front of the vehicle is predicted by the radar control unit 39, and to exert a tension of F1, which is greater than F3, when a collision is predicted by the brake control unit 38 based on the pressing rate of the brake pedal.

For example, when a collision is predicted by the brake control unit 38, the electrical seatbelt control unit 35 controls electric current being supplied to the electric motor 29 so as to fall within a first predetermined range (e.g., 10 to 20 A) so that a first predetermined tension F1 (e.g., 100 N) is exerted on the seatbelt 14. When a collision with a moving object is predicted, the electrical seatbelt control unit 35 controls electric current being supplied to the electric motor 29 so as to fall within a second predetermined range (e.g., 10 to 20 A) so that a second predetermined tension F2 (e.g., 100 N) is exerted on the seatbelt 14. When a collision with a stationary object is predicted, the electrical seatbelt control unit 35 controls electric current being supplied to the electric motor 29 so as to fall within a third predetermined range (e.g., 6 to 10 A) so that a third predetermined tension F3 (e.g., 50 N) is exerted on the seatbelt 14. In this example, the first predetermined tension F1 is set to be the same as the second predetermined tension F2; therefore, the first predetermined range of electric current is set to be the same as the second predetermined range of electric current.

In addition, in either tightening operations based on the prediction of a collision with a stationary object, based on the prediction of a collision with a moving object, and based on the prediction of a collision at braking, the electrical seatbelt control unit 35 is adapted to temporarily increase electric current supplied to the electric motor 29 at the beginning of controlling of the electric motor 29 for exerting tension on the seatbelt 14 sufficient to restrain the occupant 10 seated in the seat. More specifically, during a predetermined period immediately after the electric motor 29 starts rotation, the limit applied to electric current is set to be higher than the limit which has been set for exerting a predetermined tension on the seatbelt 14.

Figure 4:
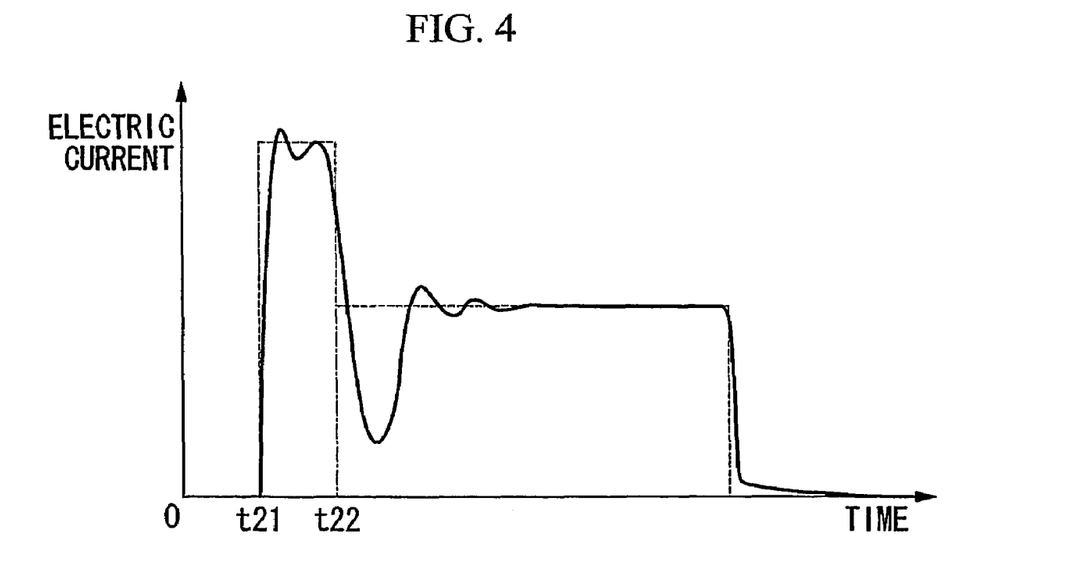
FIG. 4 is a time-domain chart showing electric current supplied to the motor in an embodiment of the seatbelt apparatus according to the present invention when occurrence of a collision with a moving object is predicted or when occurrence of a collision is predicted based on an operation of the brake.
Figure 5:
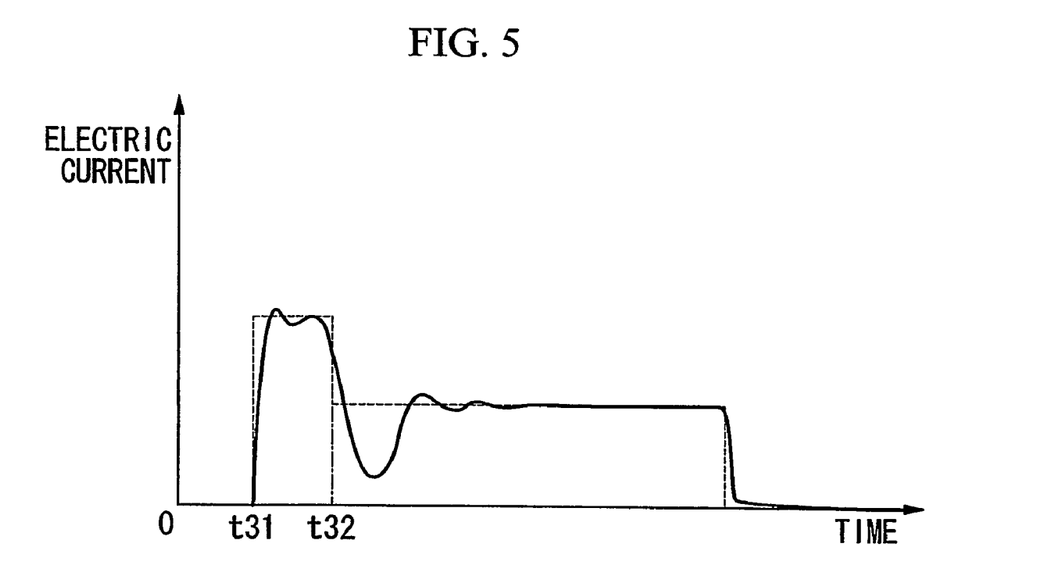
FIG. 5 is a time-domain chart showing electric current supplied to the motor in an embodiment of the seatbelt apparatus according to the present invention when occurrence of a collision with a stationary object is predicted.

This control operation will be further explained with reference to FIGS. 4 and 5. When a collision is predicted based on a brake operation, during a predetermined period immediately after the electric motor 29 starts rotation, i.e., during a first initial period (e.g., 50 ms) from time t21 to time t22 shown in FIG. 4, the limit of electric current is set to be a predetermined first initial limit (e.g., 20 A), and after the first initial period, the limit of electric current is set to be a predetermined first limit (e.g., 10 A) which is lower than the first initial limit. Moreover, when a collision with a moving object is predicted, during a predetermined period immediately after the electric motor 29 starts rotation, i.e., during a second initial period (e.g., 50 ms) from time t21 to time t22 shown in FIG. 4, the limit of electric current is set to be a predetermined second initial limit (e.g., 20 A), and after the second initial period, the limit of electric current is set to be a predetermined second limit (e.g., 10 A) which is lower than the second initial limit. Furthermore, when a collision with a stationary object is predicted, during a predetermined period immediately after the electric motor 29 starts rotation, i.e., during a third initial period (e.g., 50 ms) from time t31 to time t32 shown in FIG. 5, the limit of electric current is set to be a predetermined third initial limit (e.g., 10 A), and after the third initial period, the limit of electric current is set to be a predetermined third limit (e.g., 6 A) which is lower than the third initial limit. In this example, the first predetermined tension F1 is set to be the same as the second predetermined tension F2; therefore, the first initial limit is set to be the same as the second initial limit, and also the first limit is set to be the same as the second limit. In each of FIGS. 4 and 5, a broken line represents a control target of electric current, and a solid line represents an actual operation electric current.

The electric motor 29 may be controlled so that tension F2 for the case in which a collision with a moving object is predicted is set to be greater than the tension F3 for the case in which a collision with a stationary object is predicted, and the tension F1 for the case in which a collision is predicted based on a brake operation is set to be greater than the tension F2 for the case in which a collision with a moving object is predicted (i.e., F3<F2<F1). In this case, when a collision with a stationary object is predicted, the electric current supplied to the electric motor 29 is controlled so as to fall within a third predetermined range (e.g., 6 to 10 A), when a collision with a moving object is predicted, the electric current supplied to the electric motor 29 is controlled so as to fall within a second predetermined range (e.g., 10 to 20 A), and when a collision is predicted based on a brake operation, the electric current supplied to the electric motor 29 is controlled so as to fall within a first predetermined range (e.g., 20 to 25 A). In this case, the first initial limit is set to be greater than the second initial limit, and also the first limit is set to be greater than the second limit.

An example of timing of various operations in the seatbelt apparatus 15 in the present embodiment along with degree of deceleration will be explained below in a time-domain manner with reference to FIG. 6.

The radar control unit 39 detects an object in front of the vehicle (e.g., a vehicle) using a radar, and when it is determined that the distance between the object in front of the vehicle and the vehicle is decreased to less than a predetermined value based on the radar signals, an automatic braking control operation is started (at time t41 in FIG. 6), and a signal indicating a stationary object is output when the object in front of the vehicle is a stationary object, and a signal indicating a moving object is output when the object in front of the vehicle is a moving object. At the beginning stage of the automatic braking control operation (from time t41 to time t42 in FIG. 6), the radar control unit 39 gives warning to the occupant 10 that the distance between the object in front of the vehicle and the vehicle is decreased using a voice message by operating a voice message output device.

Figure 6:
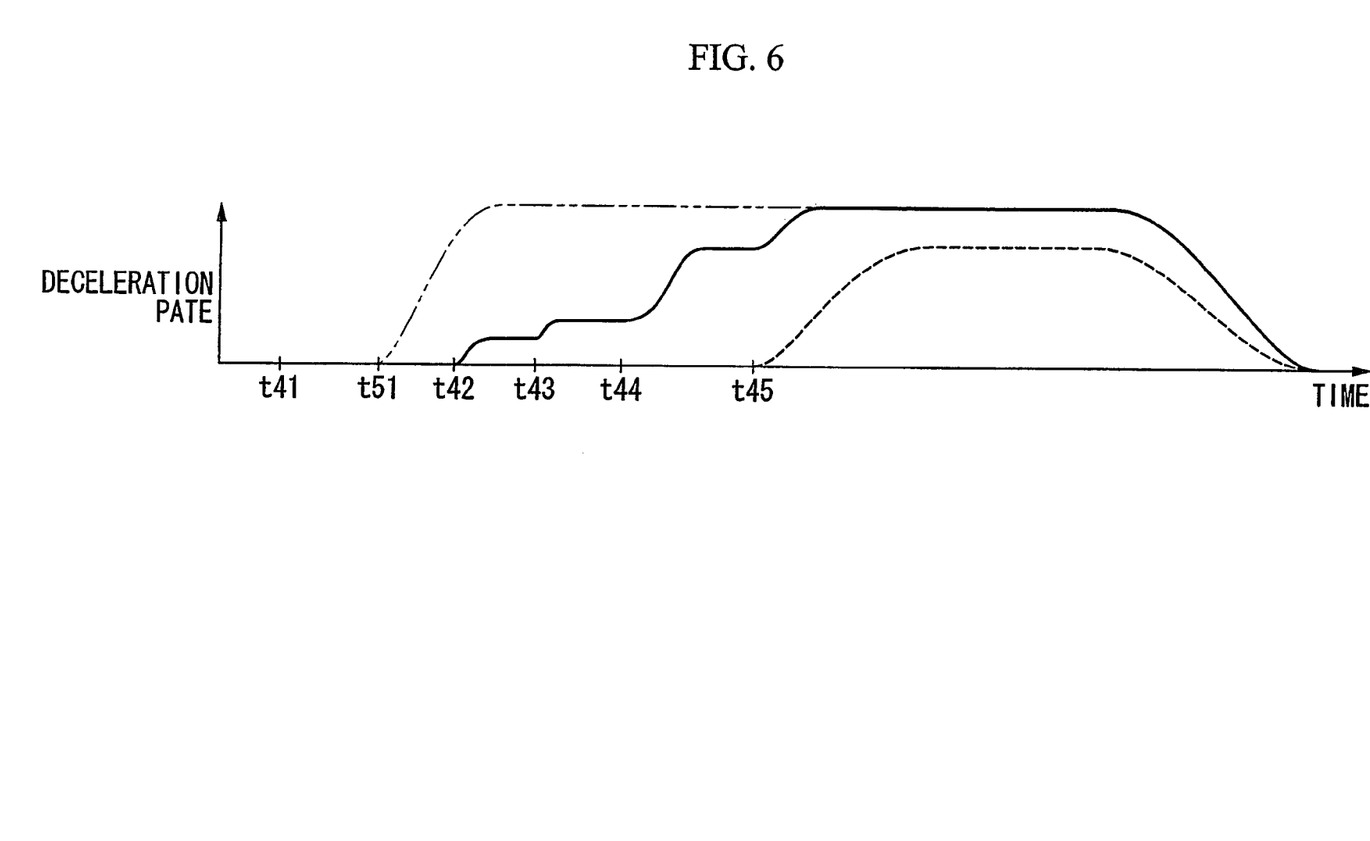
FIG. 6 is a time-domain chart showing various operations and degree of deceleration in an embodiment of the seatbelt apparatus according to the present invention.

Next, when it is determined that a state in which the distance between the object in front of the vehicle and the vehicle is decreased to less than a predetermined value is maintained for a predetermined period (e.g., 1 second) despite the voice warning, the radar control unit 39 executes a first deceleration control operation in which the radar control unit 39 notifies the occupant 10, through a sense of deceleration, that a braking force is generated by operating a brake hydraulic pressure control device so that a braking force for obtaining a predetermined degree of deceleration is generated (from time t42 to time t43 in FIG. 6).

Moreover, when it is determined that a state in which the distance between the object in front of the vehicle and the vehicle is decreased to less than a predetermined value is maintained for a predetermined period (e.g., 0.5 seconds) despite deceleration of the vehicle, the radar control unit 39 executes a second deceleration control operation in which the radar control unit 39 notifies the occupant 10 that a braking force is generated by operating the brake hydraulic pressure control device so that a greater braking force for obtaining a predetermined greater degree of deceleration is generated (from time t43 to time t44 in FIG. 6).

On the other hand, when a collision with a moving object in front of the vehicle is predicted by the radar control unit 39, and when the automatic braking control operation is being executed, the electrical seatbelt control unit 35 receives a signal indicating a moving object. When it is determined, based on the signal indicating a moving object, that a state in which the signal indicating a moving object is continuously input is maintained for a predetermined period (e.g., 1 second) which is the same as the above-mentioned predetermined period used for determining beginning of deceleration operation (at time t42 in FIG. 6), the electrical seatbelt control unit 35 executes a warning operation in which a warning is given to the occupant 10 using the seatbelt 14 on condition that the buckle signal output from the buckle switch 45 is input to the electrical seatbelt control unit 35 via the airbag control unit 43. More specifically, a warning is given to the occupant 10 by operating the electric motor 29 of the second pretensioner 30 so that normal rotations by which the seatbelt 14 is tightened and reverse rotations by which the seatbelt 14 is loosened are alternately repeated.

Figure 2:
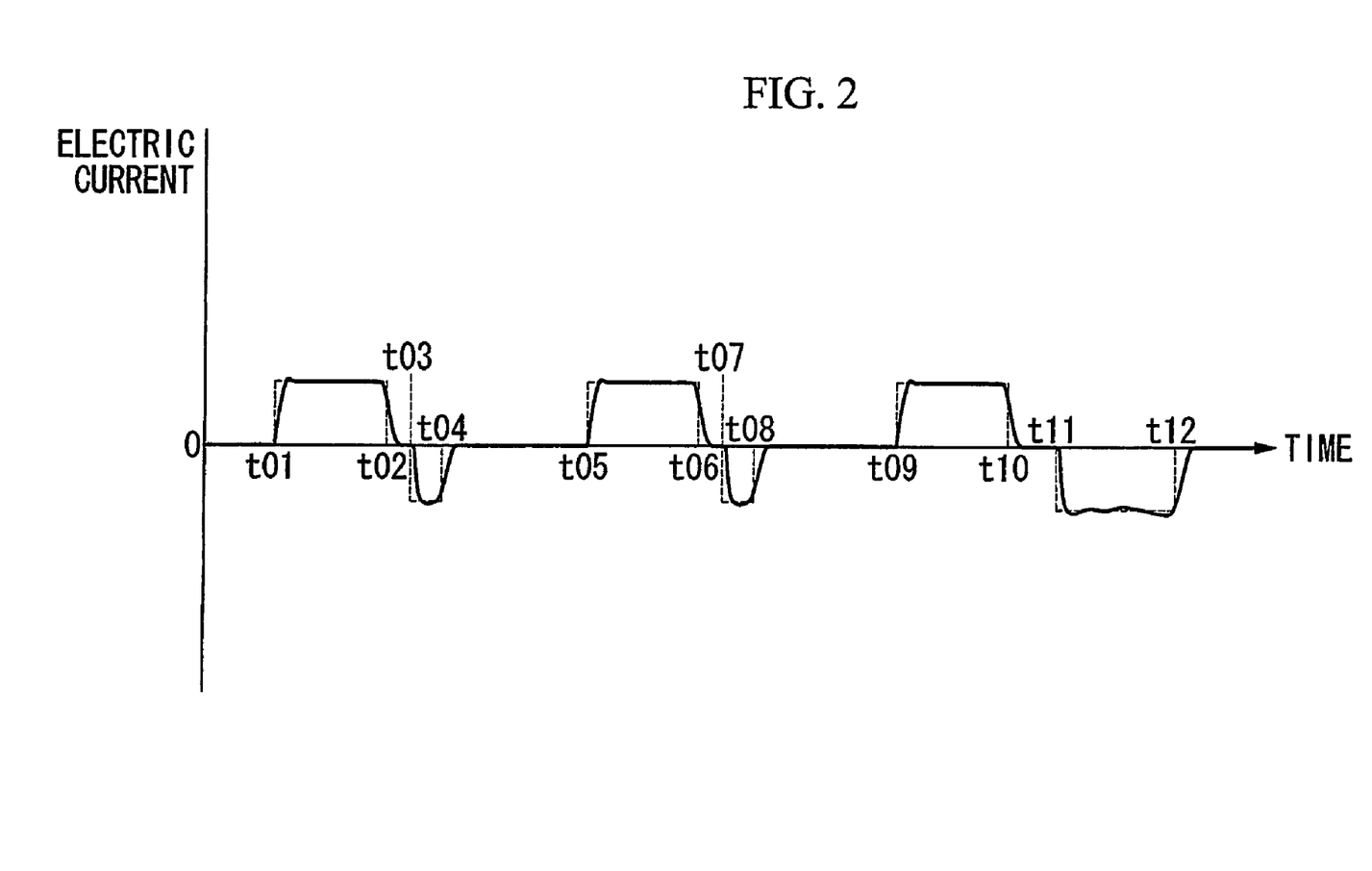
FIG. 2 is a time-domain chart showing electric current supplied to a motor during a warning mode in an embodiment of the seatbelt apparatus according to the present invention.

As shown in FIG. 2, in the warning operation, the electric motor 29 is operated in the normal direction for a predetermined first normal operation period (e.g., 100 ms), the electric motor 29 is stopped for a predetermined first stop period (e.g., 10 ms), the electric motor 29 is operated in the reverse direction for a predetermined first reverse operation period (e.g., 50 ms), and then the electric motor 29 is stopped for a predetermined pause period (e.g., 150 ms). Next, the electric motor 29 is operated in the normal direction for a predetermined second normal operation period (e.g., 100 ms), the electric motor 29 is stopped for a predetermined second stop period (e.g., 10 ms), the electric motor 29 is operated in the reverse direction for a predetermined second reverse operation period (e.g., 50 ms), and then the electric motor 29 is stopped for a predetermined pause period (e.g., 150 ms). Next, the electric motor 29 is operated in the normal direction for a predetermined third normal operation period (e.g., 100 ms), the electric motor 29 is stopped for a predetermined third stop period (e.g., 50 ms), and then the electric motor 29 is operated in the reverse direction for a predetermined third reverse operation period (e.g., 100 ms).

Figure 3:
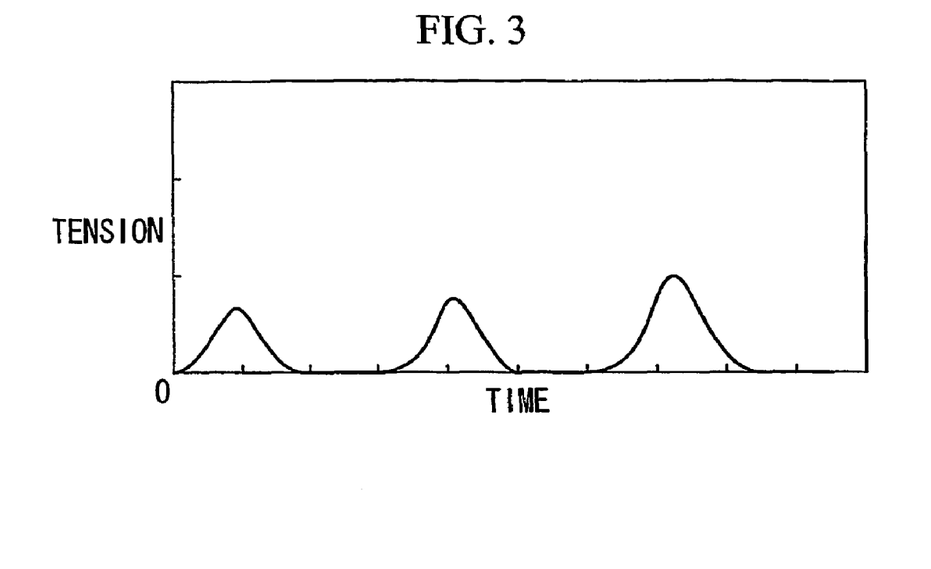
FIG. 3 is a time-domain chart showing tension exerted on the seatbelt during a warning mode in an embodiment of the seatbelt apparatus according to the present invention.

Through the above warning operation, exerting tension on the seatbelt 14 by winding the seatbelt 14, i.e., tightening the seatbelt 14, and releasing the tension on the seatbelt 14 by unwinding the seatbelt 14, i.e., loosening the seatbelt 14, are alternately repeated as shown in FIG. 3, so that a warning is given to the occupant 10 using the seatbelt 14. This warning operation is executed substantially simultaneously with the above-mentioned deceleration control operation (from time t42 to time t44 in FIG. 6). Alternatively, the warning operation may be accompanied with a visual warning using, for example, a warning lamp, may be accompanied with an audible warning using, for example, a voice message output device, or may be accompanied with other type of warnings, and these warnings may be combined.

When it is determined that a state in which the distance between the object in front of the vehicle and the vehicle is decreased to less than a predetermined value is maintained for a predetermined period (e.g., 2 seconds) despite the deceleration control operation and the warning operation, the radar control unit 39 executes an emergency automatic braking operation in which the radar control unit 39 controls the brake hydraulic pressure control device so that a greater braking force for obtaining a predetermined greater degree of deceleration is generated (at time t44 or thereafter in FIG. 6).

On the other hand, when a collision with an object in front of the vehicle is predicted by the radar control unit 39, and when it is determined, based on a signal indicating a stationary object or a moving object, by the electrical seatbelt control unit 35, which receives a signal indicating one of a stationary object and a moving object during the automatic braking control operation, that a state in which the signal indicating a stationary object or a moving object is continuously input is maintained for a predetermined period (e.g., 2 second) which is the same as the above-mentioned predetermined period used for determining beginning of the emergency automatic braking operation (at time t44 in FIG. 6), the electrical seatbelt control unit 35 restrains the occupant 10 in the seat 13 using the seatbelt 14 by executing a tightening operation in which the electric motor 29 is rotated in the normal direction for a predetermined normal operation period (e.g., 1 second) so as to wind the seatbelt 14 for tightening, and then the electric motor 29 is stopped for at least a predetermined fixing period (e.g., 2 seconds) in order to fix the retractor 20 (i.e., in order not to allow drawing out).

When a signal indicating a stationary object is output during the above tightening operation, i.e., when a collision with a stationary object is predicted, the limit of electric current is set to be the predetermined third initial limit (e.g., 10 A), i.e., the limit of electric current is temporarily set to be a great value, during a predetermined period immediately after the electric motor 29 starts rotation, i.e., during the third initial period (e.g., 50 ms), so that the seatbelt 14 is instantly drawn taut, and after the third initial period, the limit of electric current is set to be the predetermined third limit (e.g., 6 A), which is lower than the third initial limit, so that the third predetermined tension (e.g., 50 N) as the tension F3 is exerted on the seatbelt 14. On the other hand, when a signal indicating a moving object is output during the above tightening operation, i.e., when a collision with a moving object (e.g., a proceeding vehicle) is predicted, the limit of electric current is set to be the predetermined second initial limit (e.g., 20 A), i.e., the limit of electric current is temporarily set to be a great value, during a predetermined period immediately after the electric motor 29 starts rotation, i.e., during the second initial period (e.g., 50 ms), so that the seatbelt 14 is instantly, and after the second initial period, the limit of electric current is set to be the predetermined second limit (e.g., 10 A), which is lower than the second initial limit, so that the second predetermined tension (e.g., 100 N) as the tension F2 is exerted on the seatbelt 14.

After this control operation, when it is determined that, after a brake signal is output from a brake switch, for example, upon a braking operation by the occupant 10 (at time t45 in FIG. 6), the pressing of the brake pedal is released and the brake signal is ended, or when it is determined that the vehicle speed is zero based on the output signal from the vehicle speed sensor, the electrical seatbelt control unit 35 operates the electric motor 29 so that the fixing of the retractor 20, i.e., the tightening operation, is cancelled. In FIG. 6, the broken indicates a degree of deceleration due to the braking operation by the occupant 10.

On the other hand, when it is determined that the pressing rate of the brake pedal exceeds a predetermined rate which is determined beforehand, i.e., when it is determined that the braking operation is an emergency brake operation (at time t51 in FIG. 6), a brake assist control operation is executed and the degree of deceleration is quickly increased (represented by the two-dot chain line in FIG. 6) because a collision with an object in front of the vehicle is predicted. When the electrical seatbelt control unit 35 receives the BA signal which is output during the brake assist control operation, the electrical seatbelt control unit 35 restrains the occupant 10 in the seat 13 using the seatbelt 14 by executing a tightening operation in which the electric motor 29 is rotated in the normal direction for a predetermined normal operation period (e.g., 1 second) so as to wind the seatbelt 14 for tightening, and then the electric motor 29 is stopped for at least a predetermined fixing period (e.g., 2 seconds) in order to fix the retractor 20 (i.e., in order not to allow drawing out).

When a collision with an object in front of the vehicle is predicted based on the pressing rate of the brake pedal, the limit of electric current is set to be the predetermined first initial limit (e.g., 20 A), i.e., the limit of electric current is temporarily set to be a great value, during a predetermined period immediately after the electric motor 29 starts rotation, i.e., during the first initial period (e.g., 50 ms), so that the seatbelt 14 is instantly drawn taut, and after the first initial period, the limit of electric current is set to be the predetermined first limit (e.g., 10 A), which is lower than the first initial limit, so that the first predetermined tension (e.g., 100 N) as the tension F1 is exerted on the seatbelt 14.

After this control operation, when it is determined that the pressing of the brake pedal is released and the brake signal is ended, or when it is determined that the vehicle speed is zero based on the output signal from the vehicle speed sensor, the electrical seatbelt control unit 35 operates the electric motor 29 so that the fixing of the retractor 20, i.e., the tightening operation, is cancelled. As a result, the seatbelt 14 can be drawn out from the retractor 20.

On the other hand, when a collision of the vehicle is detected by the crash sensor 49, the airbag control unit 43 makes the airbag deployed, and ignites the explosive first pretensioner 28 so that the seatbelt 14 is instantly drawn taut.

According to the above-described embodiment of the seatbelt apparatus 15, the following advantageous effects can be obtained.

Because the electrical seatbelt control unit 35 exerts one of the tensions of differing amounts in the seatbelt 14 depending on whether a collision with a stationary object is predicted by the radar control unit 39, a collision with a moving object is predicted by the radar control unit 39, or a collision is predicted by the brake control unit 38, and more specifically, the electrical seatbelt control unit 35 exerts a greater amount of tension on the seatbelt 14 when a collision with a moving object is predicted and when a collision is predicted by the brake control unit 38 than when a collision with a stationary object is predicted, a great amount of tension is exerted on the seatbelt 14 for ensuring tightening by the seatbelt 14 when a collision with a moving object is predicted and when a collision is predicted by the brake control unit 38, i.e., when probability of collision is high, and a small amount of tension is exerted on the seatbelt 14 when a collision with a stationary object, such as irregularities in the road, is predicted, i.e., when probability of collision is low. Accordingly, when a collision is predicted and the occupant 10 is to be restrained in the seat 13 using the seatbelt 14, an optimum amount of tension is exerted on the seatbelt 14 depending on the prediction results for a collision, and the occupants will not experience unnecessary unusual sensations.

In addition, at the beginning of the control operation by the electrical seatbelt control unit 35 for exerting tension on the seatbelt 14, the seatbelt 14 can be instantly drawn taut by temporarily increasing electric current being supplied to the electric motor 29 so that the rotational rate of the electric motor 29 is increased.

In the above-described embodiment, the explosive first pretensioner 28 and the second pretensioner 30 operated by the electric motor 29 are both provided in the retractor 20; however, just the explosive first pretensioner 28 may be provided in the retractor 20, and the second pretensioner 30 may be provided in the buckle 30. In this case, the second pretensioner 30 draws the buckle 26 by being operated by the electric motor 29 so that the seatbelt 14 is tightened. Alternatively, dispositions of the first pretensioner 28 and the second pretensioner 30 may be reversed.

The seatbelt apparatus 15 according to the present embodiment may be applicable not only at the driver's seat, but also at the passenger seats.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

INDUSTRIAL APPLICABILITY

As described above, according to the present invention, because the control device exerts one of the tensions of differing amounts in the seatbelt depending on the prediction results by the collision prediction devices, it is possible to exert great amounts of tension on the seatbelt so as to strongly tighten the seatbelt when probability of collision is high, and to exert a small amount of tension on the seatbelt so as to moderately tighten the seatbelt when probability of collision is low. Therefore, the occupants will not experience unnecessary unusual sensations.

According to another aspect of the present invention, because the collision prediction devices include at least two of a stationary object collision prediction device for predicting occurrence of a collision with a stationary object, a moving object collision prediction device for predicting occurrence of a collision with a moving object, and a brake operation collision prediction device for predicting occurrence of a collision based on an operation of the brake of the vehicle, the control device can exert an optimum amount of tension on the seatbelt depending on the prediction results predicted by the collision prediction devices. Therefore, the occupants will not experience unnecessary unusual sensations.

According to another aspect of the present invention, because the control device is adapted to exert a greater amount of tension on the seatbelt when occurrence of a collision is predicted by the moving object collision prediction device and when occurrence of a collision is predicted by the brake operation collision prediction device than when occurrence of a collision is predicted by the stationary object collision prediction device, a stationary object, such as irregularities in the road, is detected, i.e., when probability of collision is low, a small amount of tension is exerted on the seatbelt, and when a moving object is detected, or when a collision is predicted by based on a braking operation, i.e., when probability of collision is high, a great amount of tension is exerted on the seatbelt. Therefore, the occupants will not experience unnecessary unusual sensations.

According to another aspect of the present invention, because the control device is adapted to temporarily increase electric current supplied to the actuator at the beginning of controlling of the actuator for exerting tension on the seatbelt, the operation of the actuator can be accelerated. Therefore, the seatbelt can be instantly drawn taut.

The invention claimed is:

1. A seatbelt apparatus for restraining an occupant with a seatbelt in a seat of a vehicle, comprising:
    an actuator for tightening the seatbelt at various levels of tension and for loosening the seatbelt;
    plural collision prediction devices for predicting occurrence of a collision; and
    a control device for controlling the actuator so as to exert tension on the seatbelt,
    wherein the control device exerts one of the various levels of tension on the seatbelt depending on the prediction results by the collision prediction devices,
    wherein the collision prediction devices comprise a stationary object collision prediction device for predicting occurrence of a collision with a stationary object, a moving object collision prediction device for predicting occurrence of a collision with a moving object, and a brake operation collision prediction device for predicting occurrence of a collision based on an operation of the brake of the vehicle, and
    wherein the control device exerts a greater amount of tension on the seatbelt when occurrence of a collision is predicted by the moving object collision prediction device and when occurrence of a collision is predicted by the brake operation collision prediction device than when occurrence of a collision is predicted by the stationary object collision prediction device.

2. A seatbelt apparatus according to claim 1, wherein the control device temporarily increases electric current supplied to the actuator at the beginning of controlling of the actuator for exerting tension on the seatbelt.

* * * * *